United States Patent
Chen et al.

(10) Patent No.: US 11,563,323 B2
(45) Date of Patent: Jan. 24, 2023

(54) ISLANDING DETECTION METHOD IN DC MICROGRIDS BASED ON MPPT TRAPEZOIDAL VOLTAGE DISTURBANCE

(71) Applicant: Tianjin University, Tianjin (CN)

(72) Inventors: Xiaolong Chen, Tianjin (CN); Zhiying Yang, Zunhua (CN); Yongli Li, Tianjin (CN); Bin Li, Tianjin (CN); Botong Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 117 days.

(21) Appl. No.: 17/157,187

(22) Filed: Jan. 25, 2021

(65) Prior Publication Data

US 2021/0408788 A1 Dec. 30, 2021

(30) Foreign Application Priority Data

Jun. 28, 2020 (CN) .......................... 202010596430.X (51) Int. Cl.
*H02J 1/10* (2006.01)
*H02S 40/30* (2014.01)
(Continued)

(52) U.S. Cl.
CPC .......... *H02J 1/10* (2013.01); *H02J 13/00002* (2020.01); *H02S 10/00* (2013.01); *H02S 40/30* (2014.12); *H02S 50/00* (2013.01); *H02J 2300/26* (2020.01)

(58) Field of Classification Search
CPC .... H02J 1/10; H02J 13/00002; H02J 2300/26; H02J 1/106; H02J 1/12; H02J 3/388;
(Continued)

(56) References Cited

U.S. PATENT DOCUMENTS

2016/0285263 A1* 9/2016 Hu ............................ H02J 3/08

FOREIGN PATENT DOCUMENTS

CN 106353614 A * 1/2017 ............. G01R 31/00
CN 106918754 A * 7/2017

OTHER PUBLICATIONS

Papadimitriou et al., A Novel Method for Islanding Detection in DC Networks, Jan. 2017, IEEE Publication, vol. 8, (Year: 2017).*
(Continued)

*Primary Examiner* — Rexford N Barnie
*Assistant Examiner* — Thai H Tran
(74) *Attorney, Agent, or Firm* — Hemisphere Law, PLLC; Zhigang Ma (57) ABSTRACT

The invention discloses an islanding detection method in DC microgrids based on MPPT trapezoidal voltage disturbance. The steps are as follows: start the MPPT strategy; set the starting signal threshold of disturbance; measure the output current of PVA at the maximum power; calculate the same environmental factor of PVA with different capacities under the same light intensity and temperature in real time; when the environmental factor is greater than the starting signal threshold of the disturbance, periodic trapezoidal disturbance is carried out to the PVA port voltage reference; if the PCC voltage Upcc exceeds the threshold set by the passive method, it is judged as islanding; otherwise, it is judged whether the change rule of Upcc is consistent with the change rule of the calculated PCC voltage Upccp under the trapezoidal disturbance; If it is consistent, it is judged as islanding; otherwise, it is pseudo islanding.

3 Claims, 5 Drawing Sheets

(51) Int. Cl.
    *H02S 10/00*     (2014.01)
    *H02S 50/00*     (2014.01)
    *H02J 3/00*     (2006.01)
    *H02J 13/00*     (2006.01)

(58) Field of Classification Search
    CPC .......... H02S 10/00; H02S 40/30; H02S 50/00; Y02P 80/14; G05F 1/67; Y02E 10/56; G01R 31/00
    See application file for complete search history.

(56) References Cited

OTHER PUBLICATIONS

Tran et al., The Improvement of an Islanding Detection Method Based on the Perturbation Signal in Case of a Multi-Photovoltaic Operation, Sep. 2019, Applied Sciences Publication, (Year: 2019).*

* cited by examiner

ISLANDING DETECTION METHOD IN DC MICROGRIDS BASED ON MPPT TRAPEZOIDAL VOLTAGE DISTURBANCE

FIELD OF THE INVENTION

The present invention belongs to the field of power system protection and control technology. It relates to an islanding detection method in DC microgrids based on MPPT trapezoidal voltage disturbance applicable to Distributed Generation (DG) containing multiple photovoltaic power generation systems.

BACKGROUND OF THE INVENTION

New energy power supply and mains supply complement and coordinate each other, which is an ideal way to provide reliable and high quality electric energy for users with comprehensive utilization of existing energy. Photovoltaic power generation, as an important part of new energy power supply system, has made considerable progress due to its advantages of no noise, no pollution, and not subject to regional restrictions. In the microgrids equipped with the photovoltaic power generation system DG, when the power grid stops supplying power to the load due to faults or maintenance, DG fails to detect the power failure status in a timely manner, thus forming an uncontrolled small power supply network with the load. This phenomenon is called unplanned islanding. Unplanned islanding will not only affect the stable operation of power grid and the normal use of electrical equipment, but also endanger the personal safety of power grid maintenance personnel. Therefore, DG connected to AC microgrid and DC microgrid must have stable anti-islanding function, and how to achieve accurate and fast islanding detection has become the focus of many scholars at home and abroad.

The islanding detection methods of AC microgrid have been well developed, including communication based detection method, active detection method and passive detection method. However, these existing islanding detection methods cannot be directly applied in DC microgrids. Communication detection method usually needs high cost of communication equipment, so it is difficult to be popularized and applied in DC microgrid. Passive method judges whether islanding has occurred by detecting the change of each electric quantity in the AC microgrid before and after the islanding, and there is no information such as frequency and phase in the DC microgrid. The passive method can only be used in case of overvoltage/undervoltage, with many more non-detection zones. The active method infuses the disturbance signal to the Point of Common Coupling (PCC) by grid-connected inverter and performs islanding detection according to the response of the system. However, it detects frequency or phase change, which cannot be applied in the DC microgrid. However, most of the existing DC islanding detection methods use different control strategies to inject active current disturbance into PCC through DC/DC converter. PCC voltage will gradually exceed the specified range of variation under the influence of islanding. At the same time, in order to make the PCC voltage after the islanding exceed the threshold quickly, such methods usually have positive feedback. However, it also destroys the stable operation of the system in case of islanding, which is not conducive to the planned islanding. Moreover, there is no phase information in the DC microgrid. When multiple DG inject disturbance into PCC simultaneously, it is difficult to ensure the synchronization of the disturbance without the use of communication equipment.

In addition, in case of islanding in DC microgrid, although the passive method can also achieve the purpose of islanding detection, this method is only applicable to the situation where there is a big difference between the DG output power and the power consumed by the load. When the DG output power is matched with the power consumed by the load, or there is little difference, the PCC voltage basically does not change or has little change after islanding occurs, and will not exceed the threshold set by the passive method. The passive method enters the non-detection zone. In the DC microgrid, only the voltage signal can be used. Compared with the AC microgrid, the passive detection method has a larger non-detection zone than in the DC microgrid.

SUMMARY OF THE INVENTION

The purpose of the present invention is to overcome the deficiencies of existing active DC islanding detection methods by aiming at the unplanned islanding that may occur in DC microgrid. By applying trapezoidal voltage disturbance on the basis of the existing Maximum Power Point Tracking (MPPT) control strategy, the present invention proposes an islanding detection method in DC microgrids based on MPPT trapezoidal voltage disturbance, which is applicable to DG containing multiple photovoltaic power systems. This method uses the improved MPPT control strategy to make small trapezoidal disturbance to the PVA port voltage, so as to achieve the purpose of disturbing the PVA output power. Given that there are multiple photovoltaic arrays supplying power to the load at the same time, the present invention analyzes the relation between PVA output current of different DG and proposes a strategy to ensure the synchronization of voltage disturbances applied by multiple photovoltaic arrays combined with the same light intensity and temperature of PVA in the local area where the micro-grid is located in order to ensure the synchronization of voltage applied by different PVAs. After islanding, if the PCC voltage change rule conforms to the theoretical analysis, it proves that islanding occurs in the DC microgrid.

To realize the above purpose, the technical scheme adopted in the present invention shall be as follows:

An islanding detection method in DC microgrids based on MPPT trapezoidal voltage disturbance, wherein, the steps are as follows:

$$\Delta_{ST} = k_i \frac{I_{pvm}}{N_p I_{sct}}, k_i = \frac{I_{sct}}{I_{mt}}$$

S1. Start the MPPT strategy; set the starting signal threshold of disturbance $\Delta_{Start}$; measure the output current of PVA at the maximum power; calculate the same environmental factor $\Delta_{ST}$ of PVA with different capacities under the same light intensity and temperature in real time, $$\Delta_{ST} = k_i \frac{I_{pvm}}{N_p I_{sct}}, k_i = \frac{I_{sct}}{I_{mt}}$$

Where $I_{pvm}$ is the output current of PVA with different capacities at the maximum power; $N_p$ is the number of parallel branches of PVA with different capacities; $k_i$ is the factor of proportionality;

$$\Delta_{Start} = \frac{S}{S_{ref}} + \frac{J}{100}(T - T_{ref})$$

Where S and T are the set values of light intensity and temperature at the disturbance starting time, $S_{ref}$ and $T_{ref}$ are the reference values of light intensity and temperature, and J is the temperature coefficient of short-circuit current.

S2. When the environmental factor $\Delta_{ST}$ is greater than the starting signal threshold of the disturbance $\Delta_{start}$, control all PVAs to start voltage disturbance simultaneously, which means periodic trapezoidal disturbance is carried out to the PVA port voltage reference $u_{pvref}$, so that the actual output voltage and power of PVA as well as the PCC voltage after the islanding detection are also periodically disturbed.

$$u_{pverf}(t) = \begin{cases} \frac{\Delta U_{pv}}{T_c/2} \cdot (t - nT_0) + U_{pvm} & \left(nT_0 \leq t \leq \frac{T_c}{2} + nT_0\right) \\ U_{pvm} + \Delta U_{pv} & \left(\frac{T_c}{2} + nT_0 < t \leq T_p - \frac{T_c}{2} + nT_0\right) \\ -\frac{\Delta U_{pv}}{T_c/2} \cdot (t - T_p - nT_0) + U_{pvm} & \left(T_p - \frac{T_c}{2} + nT_0 < t \leq T_p + nT_0\right) \\ U_{pvm} & (T_p + nT_0 < t \leq T_0 + nT_0) \end{cases}$$

Where, $T_0$ is the period of the trapezoidal disturbance, $T_c$ is the total duration at two waists of the trapezoidal disturbance in a period, $T_p$ is the duration of the disturbance in a period, n is a non-negative integer, $U_{pvm}$ is the voltage reference of PVA at the maximum power, and $\Delta U_{pv}$ is the amplitude of the trapezoidal disturbance.

S3. If the PCC voltage $U_{pcc}$ exceeds the threshold set by the passive method, it is judged as islanding; otherwise, it is judged whether the change rule of $U_{pcc}$ is consistent with the change rule of calculated voltage $U_{pccp}$ under the trapezoidal disturbance; If it is consistent, it is judged as islanding; otherwise, it is pseudo islanding, and continue to monitor changes in the $U_{pcc}$.

Further, to judge whether the change rule of $U_{pccp}$ is consistent with that of the calculated PCC voltage $U_{pccp}$ under the trapezoidal disturbance is to judge whether the PCC voltage meets the following two conditions: 1) The measured value, $U_{pcc}$, of the trapezoidal disturbance at the two waists is equal to the calculated value, $U_{pccp1}$, or the measured value, $U_{pcc}$, at the upper base of the trapezoidal disturbance is equal to the calculated value, $U_{pccp2}$; 2) The change period, $T_{pcc}$, of the measured value, $U_{pcc}$, is equal to the trapezoidal disturbance period, $T_0$.

Further, the calculation steps of the PCC voltage $U_{pccp1}$ of the trapezoidal disturbance at the two waists are as follows:

$$\Delta P_1 = \sum_{j=2}^{s}\left[\left(I_{pv(j-1)} - \frac{U_{pv(j-1)}}{R_s + r_{dj}}\right)\Delta U_{pvj} - \frac{1}{R_s + r_{dj}}(\Delta U_{pvj})^2\right]$$

$$r_{dj} = \frac{\Delta U_{pvj}}{\Delta I_{pvj}}$$

$$\Delta U_{pvj} = U_{pvj} - U_{pv(j-1)}$$

-continued $$\Delta I_{pvj} = I_{pvj} - I_{pv(j-1)}$$

$$U_{pccp1} = U_{pccm}\sqrt{1 + \frac{\Delta P_1}{P_m}}$$

Where, $\Delta P_1$ represents the change of PVA output power at two waists of the trapezoidal disturbance, and $U_{pccm}$ represents the PCC voltage when the PVA port voltage is equal to $U_{pvm}$. $U_{pvj}$ and $I_{pvj}$ are the sampling values of PVA port voltage and output current in current time, and $U_{pv(j-1)}$ and $I_{pv(j-1)}$ are the sampling values at the previous moment respectively. $\Delta U_{pvj}$ represents the change of PVA port voltage after each sampling. $\Delta U_{pv}=\Delta U_{pv2}+\Delta U_{pv3}+ \ldots +\Delta U_{pvs}$. s is the number of sampling (s>2), $r_{dj}$ is the dynamic resistance calculated after each sampling;

The calculation steps of the PCC voltage $U_{pccp2}$ at the upper base of the trapezoidal disturbance are as follows:

$$\Delta P_2 = \frac{1}{R_{dp} + R_s}\left[I_{sc}R_{dp}(U_{pvp} + \Delta U_{pv}) - (U_{pvp} + \Delta U_{pv})^2\right] - P_m$$

$$R_{dp} = \frac{U_{pvp} + I_{pvp}R_s}{I_{sc} - I_{pvp}}$$

$$U_{pccp2} = U_{pccm}\sqrt{1 + \frac{\Delta P_2}{P_m}}$$

Where, $\Delta P_2$ is the change of PVA output power at the upper base of the trapezoidal disturbance, $P_m$ is the output power when the PVA port voltage is $U_{pvm}$, $U_{pvp}$ is the PVA port voltage when the trapezoidal disturbance reaches its maximum value; $U_{pvp}=U_{pvm}+\Delta U_{pv}$, $R_{dp}$ is equivalent static resistance of PVA when PVA port voltage is equal to $U_{pvp}$.

Since the output power of Photovoltaic Array (PVA) will increase first and then decrease with the increase of the port voltage, the MPPT control strategy applied to PVA can ensure the maximum power output in the current external environment by adjusting the PVA port voltage. Therefore, the DC islanding detection method based on MPPT voltage disturbance proposed in the present invention imposes a periodic small trapezoidal disturbance on the PVA port voltage through a slight improvement of MPPT control strategy, so that the output power of PVA is periodically fluctuated in a small amplitude. Meanwhile, in order to ensure the synchronicity of voltage disturbance applied by multiple photovoltaic arrays, the invention can ensure the synchronicity of voltage disturbance applied by multiple photovoltaic arrays without relying on communication equipment by analyzing the relationship between PVA output current of different DG according to the characteristics of the same light intensity and external temperature in the local area where the micro-grid is located, thus ensuring the reliability of islanding detection in DC microgrid for DG containing photovoltaic power generation systems.

During the grid-connected operation, the PCC voltage basically does not change due to the clamping effect of DC bus voltage. However, after islanding occurs, due to periodic changes in PVA output power, PCC voltage also fluctuates periodically. An unplanned islanding can be accurately identified by detecting whether the change rule of PCC voltage conforms to the criteria obtained from theoretical analysis.

Different from the existing active DC islanding detection method, the invention can achieve the purpose of power disturbance only by making a slight improvement on the MPPT strategy according to the P-$U_{PV}$ output characteristics of PVA, which is easy to implement and highly accurate.

Compared with prior art, the invention has the beneficial effects as follows:

1) The invention combines active and passive DC islanding detection methods, without non-detection zone.

2) The amplitude of power disturbance is small, which has little influence on the power quality in normal operation of DC microgrid.

3) There is no need to install communication equipment when multiple photovoltaic arrays are exerting disturbance simultaneously. The synchronization of the disturbance can be guaranteed only by detecting the existing electrical quantity, thus ensuring the effectiveness of the islanding detection method.

4) The voltage disturbance only needs to be slightly improved based on the existing MPPT control strategy, which is easy to implement.

DESCRIPTION OF THE INVENTION

The technical scheme will be described in detail in combination with reference to the attached drawings.

Through appropriate modification of MPPT strategy, the output power of PVA is made to fluctuate in accordance with periodic trapezoid signal near the maximum power, thus leading to periodic fluctuation of PCC voltage after the islanding. If the change rule of PCC voltage after islanding occurs conforms to the theoretical analysis, then it is judged that islanding occurs in DC microgrid. Moreover, when multiple photovoltaic arrays supply power to the load simultaneously in the same area, given that the disturbances imposed by different PVAs may cancel each other out and thus reduce the accuracy of islanding detection, the present invention provides a scheme of disturbance synchronization, which ensures the reliability of islanding detection.

An islanding detection method in DC microgrids based on MPPT trapezoidal voltage disturbance, wherein, the steps are as follows:

Step 1, start the MPPT strategy; set the starting signal threshold of disturbance $\Delta_{start}$; measure the output current of PVA at the maximum power; calculate the same environmental factor $\Delta_{ST}$ of PVA with different capacities under the same light intensity and temperature in real time.

In order to accurately reflect the change of external light intensity and temperature without relying on sensor equipment, by analyzing the correlation between PVA output current and light intensity and temperature, the environmental factor $\Delta_{ST}$ can be obtained to reflect the change of environmental parameters by PVA output current, so that the same environmental factor $\Delta_{ST}$ can be calculated under the same light intensity and temperature for PVA with different capacities.

In order to improve the calculation accuracy of environmental factor $\Delta_{ST}$, the PVA used in this method should all be composed of photovoltaic panels of the same type, and the number of photovoltaic panels in series on different PVA parallel branches should be the same.

The active method of AC islanding detection is more reliable and accurate than the passive method. However, since most of these methods need to inject disturbance signals into PCC, when multiple photovoltaic arrays supply power to the load simultaneously, how to keep different disturbance signals synchronized is a problem that must be faced. Similarly, the active method in the DC islanding detection also needs to ensure the synchronization between different disturbance signals.

To solve this problem, a disturbance voltage synchronization strategy based on environmental factor $\Delta_{ST}$ is proposed, where the same environmental factor $\Delta_{ST}$ can be calculated for different PVAs without relying on communication, and can be used as the starting signal of disturbance, so as to ensure the synchronization of disturbance.

Figure 1:
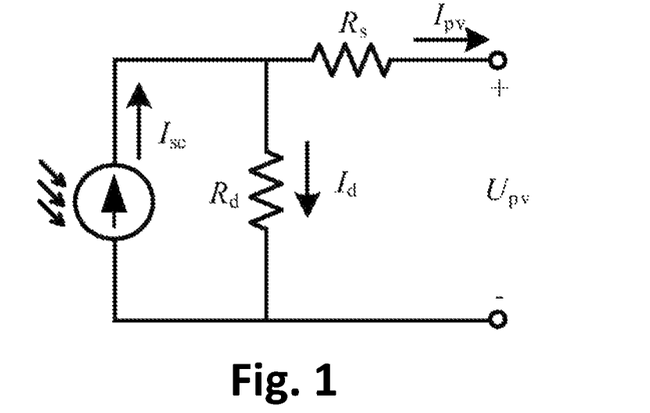
FIG. 1 shows the static equivalent circuit of photovoltaic array.

The output of PVA fluctuates because the output current of photovoltaic cells composing PVA will change with the external light intensity and temperature. However, when sudden changes in light intensity and temperature due to abrupt weather changes or obstructions are ignored, light intensity and temperature vary uniformly throughout the day and can be regarded as approximately unchanged in a short time. Since the changing speed of light intensity and temperature is far less than the tracking speed of MPPT strategy for PVA maximum power point, it can be considered that PVA has been operating at maximum power. When PVA operates stably at the maximum power point, all electric quantities in the system remain unchanged. At this time, the diode in the PVA equivalent circuit can be regarded as a static resistor $R_d$ with constant resistance, as shown in the static equivalent circuit of photovoltaic array in FIG. 1.

$$P = \frac{1}{R_d + R_s}\left(I_{sc}R_d U_{pv} - U_{pv}^2\right) \quad (1)$$

$$R_d = \frac{U_{pv} + I_{pv}R_s}{I_{sc} - I_{pv}} \quad (2)$$

The output current $I_{pv}$ of PVA, port voltage $U_{pv}$ and static resistance $R_d$ change with the light intensity and temperature. Therefore, Equation (1) represents the relationship between the output power and the port voltage when PVA operates stably under different lighting intensities and temperatures. $R_s$ is the equivalent series resistance of PVA. When PVA outputs the maximum power, its port voltage, output current and power are $U_{pvm}$, $I_{pvm}$ and $P_m$ respectively. The following equations can be obtained according to Equations (1) and (2):

$$P_m = \frac{1}{R_{dm} + R_s}\left(I_{sc}R_{dm}U_{pvm} - U_{pvm}^2\right) \quad (3)$$

$$R_{dm} = \frac{U_{pvm} + I_{pvm}R_s}{I_{sc} - I_{pvm}} \quad (4)$$

$F(U_{pv}) = I_{sc}R_{dm}U_{pv} - U_{pv}^2$, According to Equation (3), $(U_{pvm}, F(U_{pvm}))$ is a point on the quadratic function $F(U_{pvc})$. The horizontal coordinate of the symmetry axis of the quadratic function curve is $R_{dm}I_{sc}/2$. Let the factor of proportionality between it and $U_{pvm}$ be k, then the relationship between them can be expressed as:

$$kU_{pvm} = \frac{I_{sc}R_{dm}}{2} \quad (5)$$

The relationship between PVA short circuit current $I_{sc}$ and port voltage and output current can be obtained by combining Equation (4) and Equation (5).

$$I_{sc} = \frac{2kU_{pvm}}{(2k-1)\frac{U_{pvm}}{I_{pvm}} - R_s} \quad (6)$$

Since the equivalent series resistance $R_s$ of PVA is much smaller than $U_{pvm}/I_{pvm}$, and k is greater than 1, it can be ignored and simplified to Equation (7).

$$I_{sc} = \frac{2k}{(2k-1)}I_{pvm} = k_iI_{pvm}) \quad (7)$$

$$I_{sc} = I_{scref} \cdot \Delta_{ST} \quad (8)$$

$$\Delta_{ST} = \left(\frac{S}{S_{ref}} + \frac{J}{100}(T - T_{ref})\right) \quad (9)$$

According to Equation (7), there is a proportional relationship between the short circuit current $I_{sc}$ of PVA and the output current $I_{pvm}$ at the maximum power, and the proportional coefficient is $k_i$ ($k_i>1$). According to Equation (7), the short-circuit current $I_{sc}$ can be obtained directly from $I_{pvm}$. Equation (8) is PVA's correction equation for the reference value $I_{scref}$ of short-circuit current considering the actual light and temperature changes. $I_{scref}$ is the PVA's short-circuit current under standard conditions (S=1000 W/m$^2$, T=25° C.). The following equation can be obtained from the equations (7) and (8):

$$\Delta_{ST} = k_i\frac{I_{pvm}}{I_{scref}} \quad (10)$$

According to Equation (10), if $I_{scref}$ and $k_i$ are known, PVA can calculate the environmental factor $\Delta_{ST}$ in real time.

Figure 2A:
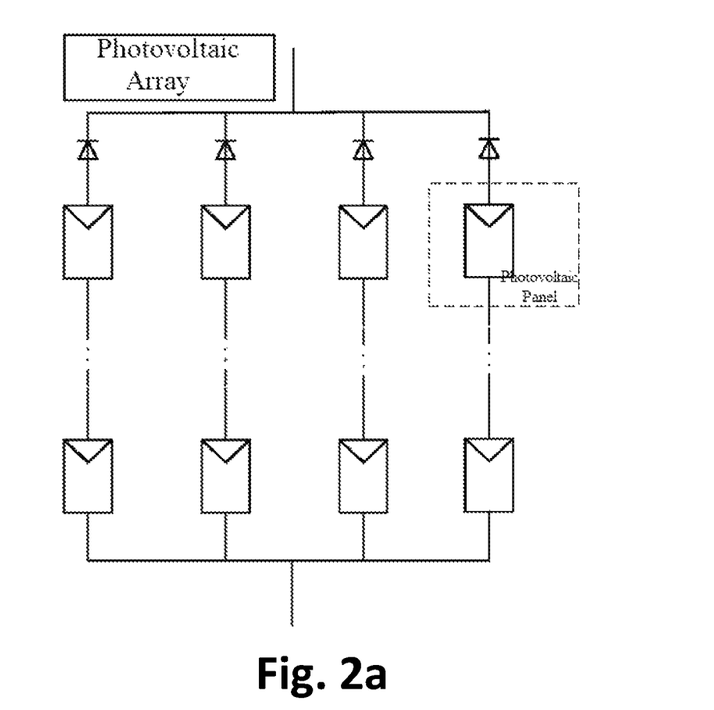
FIG. 2a is the schematic diagram of photovoltaic array.
Figure 2B:
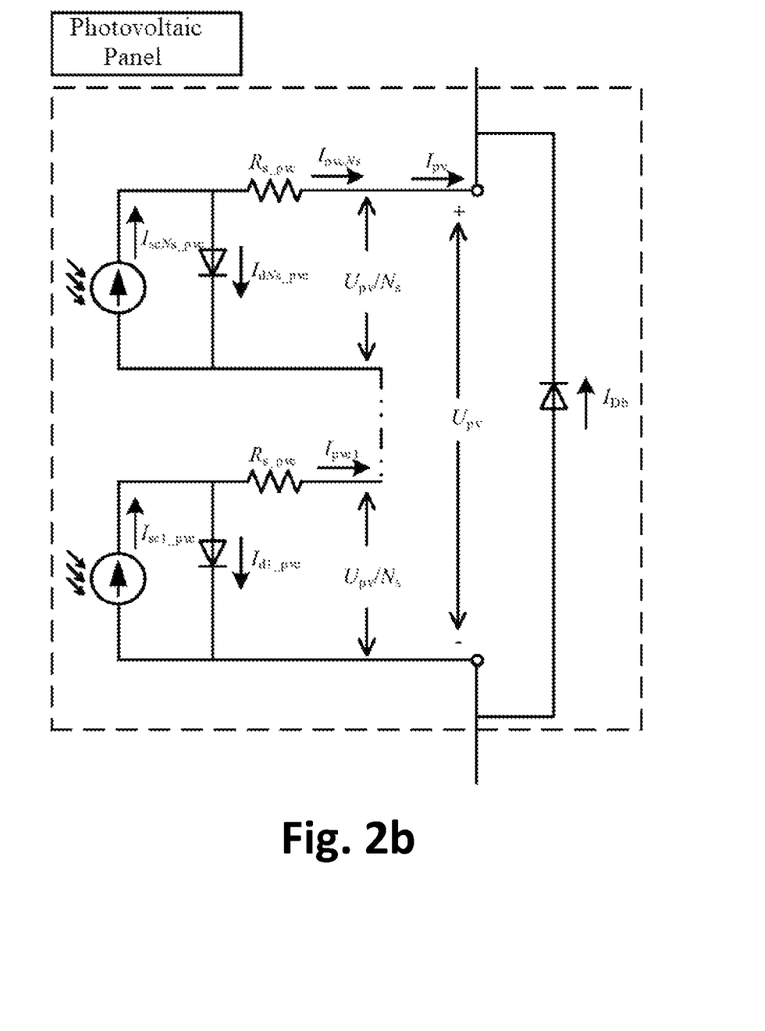
FIG. 2b is the schematic diagram of the sub-module (photovoltaic panel) of photovoltaic array.

FIG. 2a-2b shows the schematic diagram of PVA and its sub-modules. The sub-modules are equivalent to the actual photovoltaic panels, and a number of photovoltaic panels constitute PVA through series and parallel. The sum of the current of each parallel branch of PVA is equal to the total output current of PVA, and the voltage at both ends of any parallel branch is equal to the port voltage of PVA. PVA is composed of different photovoltaic panels in different series and parallel modes, and the output characteristics of PVA are also different.

As shown in the right figure in FIG. 2a, multiple photovoltaic cells are connected in series to form a single photovoltaic panel. The output current of the photovoltaic panel is equal to the output current of each photovoltaic cell $I_{pvc}$, $I_{pvc1}, \ldots, I_{pvCNs}$. And when the output current of the photovoltaic cell is less than its short-circuit current, the current $I_{Db}$ flowing through the bypass diode can be ignored. If PVA has $N_p$ parallel branches and each parallel branch has $N_{sp}$ photovoltaic panels in series, the equivalent series resistance of the whole PVA is equal to $1/N_p$ of the series resistance of a single photovoltaic cell. The relationship between PVA output current $I_{pv}$ and port voltage $U_{pv}$ is as follows:

$$I_{pv} = N_p\left[I_{sc\_pvc} - I_{0\_pvc}\left(e^{\frac{q}{NKT}(U_{pv}/N_{sp}N_s + I_{pvc}R_{s\_pvc}/N_p)} - 1\right)\right] \quad (11)$$

$I_{sc\_pvc}$, $I_{0\_pvc}$ and $R_{s\_pvc}$ are short circuit current of photovoltaic cells, diode reverse saturation current and equivalent series resistance of photovoltaic cells respectively. According to Equation (11), when the number $N_{sp}$ of photovoltaic panels in series on each parallel branch is the same, the ratio of output current of different PVA is approximately equal to the ratio of the number of parallel branches, since the series resistance $R_{s\_PVC}$ of photovoltaic cell is very small.

$$\frac{I_{pv2}}{I_{pv1}} = \frac{N_{p1}\left[I_{sc\_pvc} - I_{0\_pvc}\left(e^{\frac{q}{NKT}(U_{pv1}/N_{sp}N_s + I_{pvc}R_{s\_pvc}/N_p)} - 1\right)\right]}{N_{p2}\left[I_{sc\_pvc} - I_{0\_pvc}\left(e^{\frac{q}{NKT}(U_{pv2}/N_{sp}N_s + I_{pvc}R_{s\_pvc}/N_{p2})} - 1\right)\right]} \approx \frac{N_{p1}}{N_{p2}} \quad (12)$$

To sum up, when different PVA meet the following two conditions: 1) They are composed of photovoltaic panels of the same type; 2) The number Nsp of photovoltaic panels in series on each parallel branch is the same. Then the ratio of the output current $I_{pv}$ of different PVA is equal to the ratio of the number $N_p$ of parallel branches of different PVA, that is, the parallel branch current of different PVA is approximately equal.

The reference value of the photovoltaic panel short-circuit current $I_{sct}$ is put into Equation (10) to obtain the equation of output current $I_{pvm}$ and environmental factor $\Delta_{ST}$ when PVA operates at the maximum power.

$$\Delta_{ST} = k_i\frac{I_{pvm}}{N_pI_{sct}} \quad (13)$$

$$k_i = \frac{I_{sct}}{I_{mt}}$$

$I_{pvm}$ is the output current of PVA at the maximum power; $N_p$ is the number of parallel branches of PVA. $k_i$ will not change with light and temperature, and can be obtained directly from the short circuit current $I_{sct}$ and maximum power point output current $I_{mt}$ in the factory parameters of photovoltaic panels.

Equation (13) can be used to calculate the same environmental coefficient $\Delta_{ST}$ for different PVA. The environmental coefficient can be calculated in real time for each PVA. Set the threshold $\Delta_{Start}$ of starting disturbance so that different PVA can start the disturbance at the same time, thus ensuring the synchronization of the disturbance.

Figure 3A:
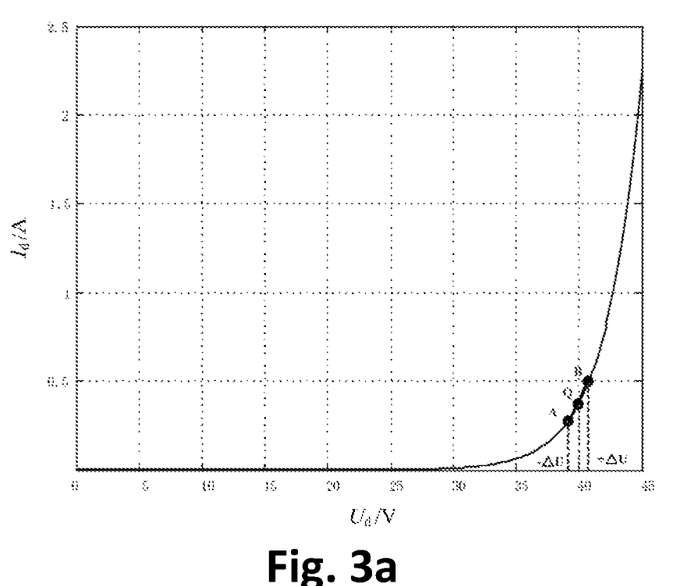
FIG. 3a shows the Id-Ud characteristic curve of the photovoltaic array equivalent diode.
Figure 3B:
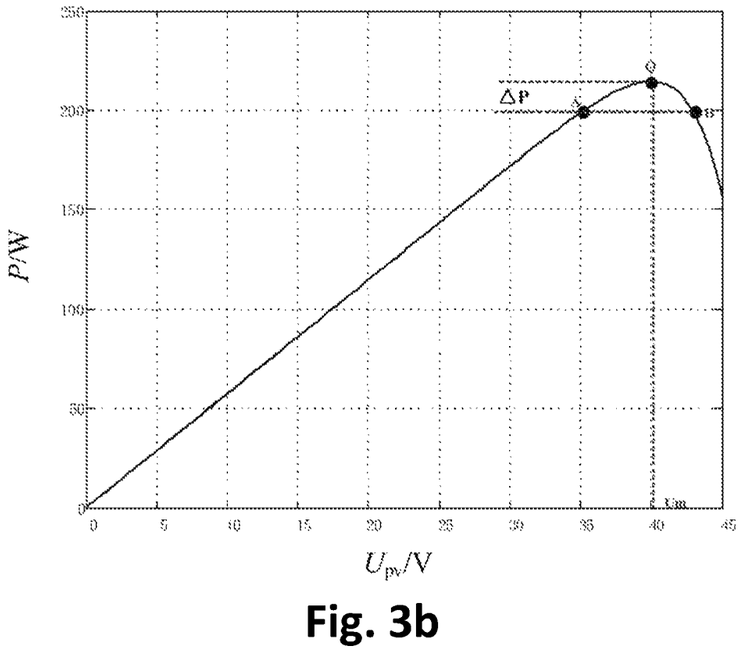
FIG. 3b shows the P-Upv characteristic curve of photovoltaic array.

FIG. 3b shows the P-$U_{pv}$ characteristic curve of PVA. The output power P will change with the PVA port voltage $U_{pv}$. Therefore, MPPT strategy can keep PVA running at the maximum power point by adjusting the size of $U_{pv}$, as shown in Point Q in FIG. 3b. If the MPPT strategy is slightly modified so that it no longer tracks the maximum power point Q but makes small fluctuations around the Point Q, such as Point A and Point B in FIG. 3b, the purpose of power disturbance can be achieved. According to the P-$U_{pv}$ characteristic curve of PVA, the slope of the curve on the right side of the maximum power point Q changes faster than the slope of the curve on the left. This means that the voltage change required for the disturbance to Point B is smaller than the disturbance to point A under the same power disturbance effect. Therefore, the present invention adopts the disturbance to the right of the maximum power point.

Figure 4:
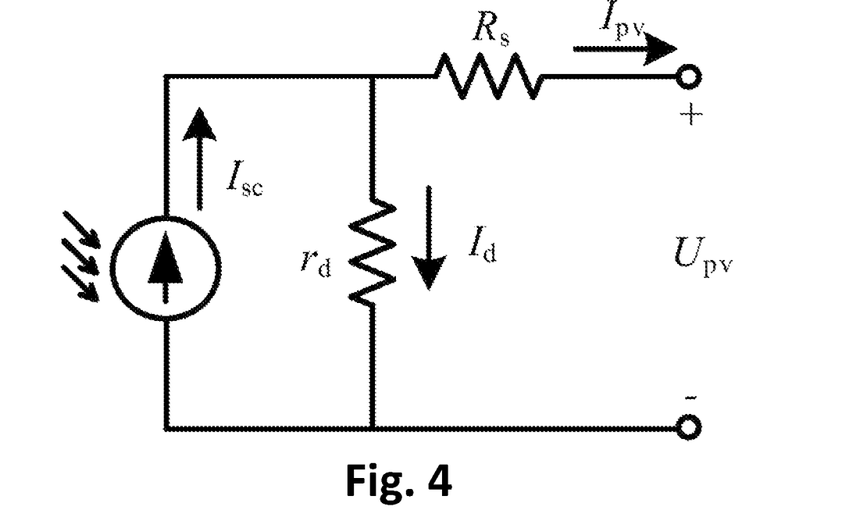
FIG. 4 shows the equivalent circuit of the small signal model of photovoltaic array.

To sum up, the change of PVA output power is realized by changing its port voltage. When $U_{pv}$ fluctuates near the voltage $U_{pvm}$ at the maximum power point, the voltage $U_d$ at both ends of the diode in the equivalent circuit of PVA will also change accordingly. At this point, the positions of the three points A, Q and B on the P-$U_{pv}$ characteristic curve on the diode $I_d$-$U_d$ characteristic curve are shown in FIG. 3a. The Point Q on the curve in FIG. 3a is the working point where the diode is located when PVA is operating at the maximum power point, and the horizontal coordinate is the voltage $U_{dm}$ at both ends of the diode at the maximum power. When the PVA port voltage changes very little near $U_m$, the voltage at both ends of the diode also changes very small, then the three points A, Q and B on the diode $I_d$-$U_d$ characteristic curve can be approximately regarded as in a straight line. At this point, the diode exhibits linear characteristics under a small voltage disturbance. The resistance is a fixed value, and is the reciprocal of the slope of the line AQB. This analysis method is called small signal model analysis method. The equivalent circuit of the photovoltaic array small signal model is shown in FIG. 4. The dynamic resistance $r_d$ is the equivalent resistance of the diode under small voltage disturbance. At this point, the relationship between PVA output current change $\Delta I_{pv}$ and voltage change $\Delta U_{pv}$ is shown as follows:

$$\Delta I_{pv} = \Delta I_{sc} - \frac{\Delta U_{pv} + \Delta I_{pv} R_s}{r_d} \tag{14}$$

$$r_d = \frac{dU_d}{dI_d}$$

$R_s$ is the equivalent series resistance of PVA, where PVA short circuit current $I_{sc}$ is unchanged before and after disturbance, so its variation $\Delta I_{sc}$ is zero. So:

$$\Delta I_{pv} = -\frac{\Delta U_{pv}}{r_d + R_s} \tag{15}$$

The idea of the present invention is to carry out periodic disturbance near the PVA maximum power point. The output current $I_{pvm}$ and port voltage $U_{pvm}$ of PVA at the maximum power point are known. Suppose the variation of voltage and current are:

$$\Delta U_{pv} = U_{pvp} - U_{pvm} \tag{16}$$

$$\Delta I_{pv} = I_{pvp} - I_{pvm} \tag{17}$$

$U_{pvp}$ and $I_{pvp}$ are the port voltage and output current of PVA when the power decreases to a stable level after disturbances are applied respectively. According to Equation (16) and Equation (17), $U_{pvm}$, $I_{pvm}$, $\Delta I_{pv}$ and $\Delta U_{pv}$ can represent the change of PVA output power $\Delta P_1$:

$$\Delta P_1 = \Delta U_{pv} I_{pvm} + \Delta I_{pv} U_{pvm} + \Delta U_{pv} \Delta I_{pv} \tag{18}$$

According to Equations (15)-(18), the relationship between variation $\Delta U_{pv}$ of PVA port voltage and output power variation $\Delta P$ of photovoltaic cell can be obtained.

$$\left(I_{pvm} - \frac{U_{pvm}}{R_s + r_{dm}}\right)\Delta U_{pv} - \frac{1}{R_s + r_{dm}}(\Delta U_{pv})^2 = \Delta P_1 \tag{19}$$

With small voltage disturbance, the dynamic resistance of the diode is a fixed value $r_{dm}$, which can be obtained by taking the derivative of the $U_{dm}$ and inverting according to the diode $I_d$-$U_d$ characteristic curve. According to the analysis of the diode $I_d$-$U_d$ characteristic curve in the FIG. 3a, the voltage variation at both ends of the diode is small when the variation $\Delta U_{pv}$ of PVA port voltage is very small (less than 1V). At this point, the dynamic resistance $r_d$ is approximately unchanged at $\Delta U_{pv}$. However, for PVA, the variation of port voltage around 1V will not lead to the fluctuation of PVA output power, which cannot achieve the purpose of power disturbance.

However, the $\Delta U_{pv}$ sufficient to cause PVA output power fluctuation can be divided into several cells by the definite integral method, and the dynamic resistance corresponding to each cell can be regarded as a fixed value, satisfying the conditions required in Equation (19). The sum of all the inter-cell power variations is the total power variation $\Delta P_1$.

$$\Delta P_1 = \sum_{j=2}^{s}\left[\left(I_{pv(j-1)} - \frac{U_{pv(j-1)}}{R_s + r_{dj}}\right)\Delta U_{pvj} - \frac{1}{R_s + r_{dj}}(\Delta U_{pvj})^2\right] \tag{20}$$

$$r_{dj} = \frac{\Delta U_{pvj}}{\Delta I_{pvj}} \tag{21}$$

$$\Delta U_{pvj} = U_{pvj} - U_{pv(j-1)} \tag{22}$$

$$\Delta I_{pvj} = I_{pvj} - I_{pv(j-1)} \tag{23}$$

Equation (20) is the PVA power variation equation of trapezoidal disturbance at the two waists. Where, $I_{pvj}$ and $U_{pvj}$ are the sampling values of PVA port voltage at the current moment, $U_{pv(j-1)}$ and $I_{pv(j-1)}$ are the sampling values of PVA port voltage and output current at the previous moment, and $\Delta U_{pvj}$ is the variation of PVA port voltage after each sampling. $\Delta U_{pv} = \Delta U_{pv2} \pm \Delta U_{pv3} + \ldots + \Delta U_{pvs}$. s is the number of sampling (s>2), $r_{dj}$ is the dynamic resistance calculated after each sampling;

When the PVA port voltage gradually increases from $U_{pvm}$ to $U_{pvp}$ and becomes stable, the output power of PVA will no longer decrease, reaching a new stable operating point. At this point, the circuit satisfies the equivalent condition of static resistance. According to Equation (3), the following equations can be obtained:

$$\Delta P_2 = \frac{1}{R_{dp} + R_s}\left[I_{sc}R_{dm}(U_{pvm} + \Delta U_{pv}) - (U_{pvm} + \Delta U_{pv})^2\right] - P_m \tag{24}$$

$$R_{dp} = \frac{U_{pvp} + I_{pvp}R_s}{I_{sc} - I_{pvp}} \tag{25}$$

Where, $\Delta P_2$ is the variation of PVA output power at the upper base of the trapezoidal disturbance, $P_m$ is the output power when the PVA port voltage is $U_{pvm}$, $U_{pvp}$ is the PVA port voltage when the trapezoidal disturbance reaches its maximum value; $U_{pvp}=U_{pvm}+\Delta U_{pv}$, $R_{dp}$ is equivalent static resistance of PVA when PVA port voltage is equal to $U_{pvp}$.

If the power $P_L$ consumed by DC load during grid-connected operation differs greatly from the output power P of PVA, according to the following equations, the PCC voltage $U_{pcc}$ will change significantly after islanding occurs.

$$P_L = \frac{U_N^2}{R} \tag{26}$$

$$P = \frac{U_{pcc}^2}{R}$$

Where, $U_N$ is the rated voltage of DC bus. When the DC power grid is in normal operation, the allowable deviation range of DC bus voltage varies according to the DC voltage level. It is stipulated in the Chinese National Standard GB/T 35727-2017 that the allowable voltage deviation range of low-voltage DC distribution network below 1500V is −20%−+5% of $U_N$.

Therefore, the threshold of the passive method in the present invention is set as 0.8 $U_N$ and 1.05 $U_N$. When it is detected in the system that the $U_{pcc}$ is less than 0.8 $U_N$ or greater than 1.05 $U_N$, it will be judged as islanding. According to the standard, the variation range of PVA output power P can be calculated from the above equation, which is 0.64 $P_L$~1.1025 $P_L$. In other words, when P<0.64 $P_L$ or P>1.1025 $P_L$, the PCC voltage will exceed the threshold of passive method after the islanding occurs.

If the output power of PVA matches the load power or changes little, the $U_{pcc}$ will not exceed the threshold of the passive method after the islanding occurs. According to equations (20) and (27), equations (24) and (27), the calculated $U_{pcc1}$ and $U_{pcc2}$ of PCC voltage at the two waists and the upper base of trapezoidal disturbance can be obtained respectively.

$$\Delta P = \frac{U_{pccp}^2 - U_{pccm}^2}{R} \tag{27}$$

$$U_{pccp1} = \sqrt{U_{pccm}^2 + \Delta P_1 \cdot R} \tag{28}$$

$$U_{pccp2} = \sqrt{U_{pccm}^2 + \Delta P_2 \cdot R} \tag{29}$$

In the actual situation, the load resistance is usually unknown. After the islanding occurs, the load resistance R can be calculated according to the output power of the PVA array and the PCC voltage. Therefore, equations (28) and (29) can be expressed as:

$$U_{pccp1} = U_{pccm}\sqrt{1 + \frac{\Delta P_1}{P_m}} \tag{30}$$

$$U_{pccp2} = U_{pccm}\sqrt{1 + \frac{\Delta P_2}{P_m}} \tag{31}$$

Specifically, judge whether the PCC voltage meets the following two conditions: 1) The measured $U_{pcc}$ at the two waists of the trapezoidal disturbance is equal to the calculated $U_{pccp1}$, or the measured $U_{pcc}$ at the upper base of the trapezoidal disturbance is equal to the calculated $U_{pccp2}$; 2) The change period, $T_{pcc}$, of measured $U_{pcc}$, is equal to the trapezoidal disturbance period, $T_0$. If the conditions are met, it will be judged as islanding; otherwise, it will be pseudo islanding, and the change of $U_{pcc}$ will continue to be monitored.

Figure 5:
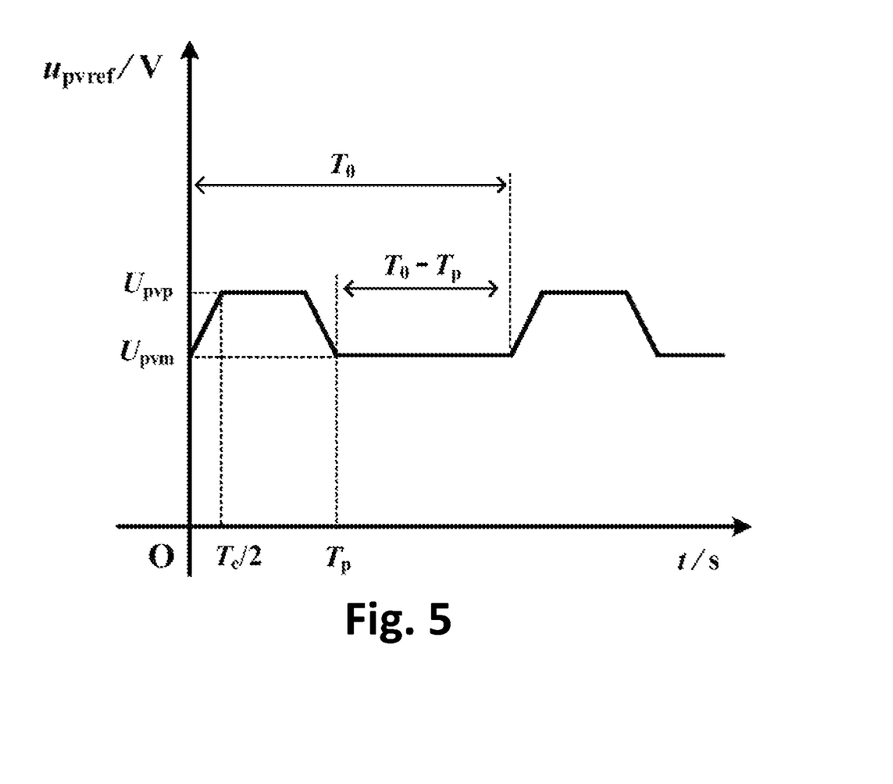
FIG. 5 is the schematic diagram of the trapezoidal disturbance of PVA port voltage.

The power disturbance in the invention is realized by changing the voltage reference value $u_{pvref}$ of MPPT strategy, and the piecewise function of $u_{pvref}$ that changes with time is shown in Equation (32):

$$u_{pvref}(t) = \tag{32}$$
$$\begin{cases} \frac{\Delta U_{pv}}{T_c/2} \cdot (t - nT_0) + U_m & \left(nT_0 \le t \le \frac{T_c}{2} + nT_0\right) \\ U_{pvm} + \Delta U_{pv} & \left(\frac{T_c}{2} + nT_0 < t \le T_p - \frac{T_c}{2} + nT_0\right) \\ -\frac{\Delta U_{pv}}{T_c/2} \cdot (t - T_p - nT_0) + U_m & \left(T_p - \frac{T_c}{2} + nT_0 < t \le T_p + nT_0\right) \\ U_{pvm} & (T_p + nT_0 < t \le T_0 + nT_0) \end{cases}$$

Where, $T_0$ is the period of trapezoidal wave, $T_c$ is the duration of two waists of trapezoidal wave, $T_p$ is the duration of disturbance, and n is an integer greater than zero. $\Delta U_{pv}$ is the variation of port voltage, and $U_{pvm}$ is the voltage reference value at the maximum power point.

Figure 6:
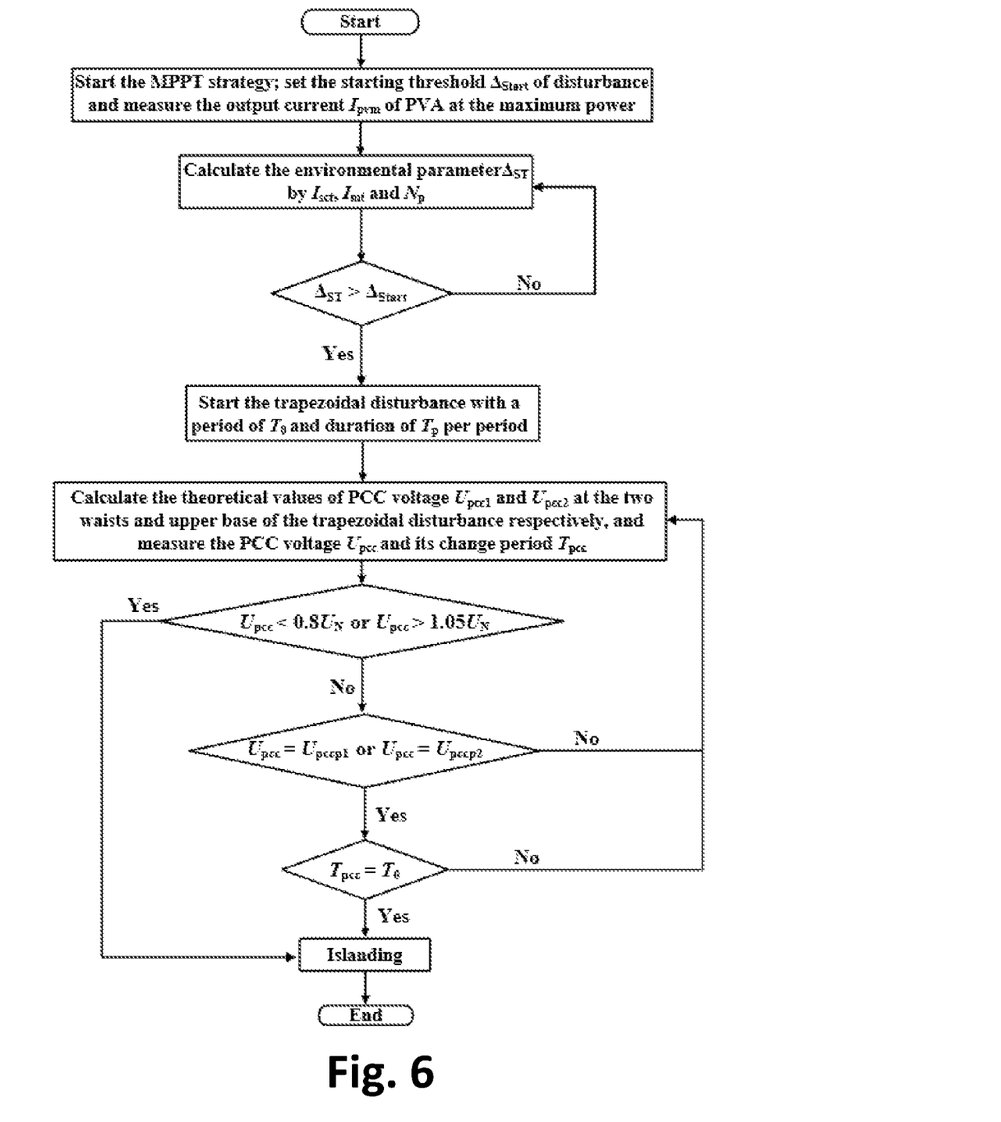
FIG. 6 is the flow chart of the islanding detection method proposed for DC microgrid containing multiple DG.

When unplanned islanding occurs in the DC system, the mismatch between supply and demand of DG and load will cause the voltage change at PCC. Although over-voltage/under-voltage passive method has a large non-detection zone, it can still quickly realize islanding detection in the case of mismatch between supply and demand. Therefore, according to the passive method, an islanding detection method based on the PCC voltage change rule in the disturbance period and applicable to the DC microgrid containing multiple DG is formed, as shown in the FIG. 6. As shown in FIG. 6, the detailed steps of the scheme are as follows:

Step 1: First, start MPPT strategy to track the maximum power of photovoltaic array, and measure the output current at maximum power $I_{pvm}$ in real time. Then, set the threshold of environmental parameters for starting disturbance as $A_{Start}$ according to the change of actual light intensity and temperature.

Step 2: The value of $A_{ST}$ is calculated in real time by the $I_{pvm}$ measured in the previous step and the known factory parameters of photovoltaic panel $I_{mt}$, $I_{sct}$ and the number of parallel branches of photovoltaic array $N_p$.

Step 3: When $A_{ST}$ is greater than the set threshold $A_{Start}$, the photovoltaic array will start trapezoidal disturbance with a period of $T_0$ and duration of $T_p$.

Step 4: Calculate the theoretical values of $U_{pccp1}$ and $U_{pccp2}$ of PCC voltage at the two waists and the upper base of the trapezoidal disturbance respectively, and detect the change of PCC voltage $U_{pcc}$ and the change period $T_{pcc}$ of PCC voltage in real time. If $U_{pcc}$<0.8 $U_N$ or $U_{pcc}$>1.05 $U_N$, the passive method will directly detect it as islanding. Go to step 5 if the threshold of passive method is not exceeded.

Step 5: Judge whether $U_{pcc}$ is equal to the calculated value of PCC voltage $U_{pccp1}$ or $U_{pccp2}$, at the time of disturbance. If one of the conditions is met, go to Step 6; otherwise, return to the previous step.

Step 6: Judge whether the PCC voltage variation period $T_{pcc}$ is equal to $T_0$. If the conditions are met, it will be judged as islanding; otherwise, it will be judged as pseudo islanding, and return to Step 4.

The above are only the preferred embodiments of the present invention, and are not intended to limit the scope of the invention. The claims define the scope of the protection of the present invention.

It will be appreciated by one skilled in the art that numerous changes and additions could be made thereto without deviating from the spirit or scope of the invention.

The invention claimed is:

1. An islanding detection method in Direct Current (DC) microgrids based on Maximum Power Point Tracking (MPPT) trapezoidal voltage disturbance, wherein, the steps are as follows:

start a MPPT strategy; set a starting signal threshold of disturbance $\Delta_{Start}$; measure an output current of Photovoltaic Array (PVA) at a maximum power; calculate same environmental factor $\Delta_{ST}$ of PVA with different capacities under same light intensity and temperature in real time, $$\Delta_{ST} = k_i \frac{I_{pvm}}{N_p I_{sct}}$$

$$k_i = \frac{I_{sct}}{I_{mt}}$$

where, $I_{pvm}$ is an output current of PVA with different capacities at the maximum power; $N_p$ is a number of parallel branches of PVA with different capacities; $k_i$ is a factor of proportionality, $I_{sct}$ is a short circuit current and $I_{mt}$ is a Maximum Power Point output current;

$$\Delta_{Start} = \frac{S}{S_{ref}} + \frac{J}{100}(T - T_{ref})$$

where, S and T are a set values of light intensity and temperature at a disturbance starting time, $S_{ref}$ and $T_{ref}$ are reference values of light intensity and temperature, and J is a temperature coefficient of short-circuit current;

when the environmental factor $\Delta_{ST}$ is greater than the starting signal threshold $\Delta_{start}$ of the disturbance, control all PVAs to start voltage disturbance simultaneously, which means periodic trapezoidal disturbance is carried out to a PVA port voltage reference $U_{pvref}$, so that an actual output voltage and power of PVA as well as a Point of Common Coupling (PCC) voltage $U_{pcc}$ after an islanding are also periodically disturbed;

$$u_{pvref}(t) = \begin{cases} \frac{\Delta U_{pv}}{T_c/2} \cdot (t - nT_0) + U_{pvm} & \left(nT_0 \le t \le \frac{T_c}{2} + nT_0\right) \\ U_{pvm} + \Delta U_{pv} & \left(\frac{T_c}{2} + nT_0 < t \le T_p - \frac{T_c}{2} + nT_0\right) \\ -\frac{\Delta U_{pv}}{T_c/2} \cdot (t - T_p - nT_0) + U_{pvm} & \left(T_p - \frac{T_c}{2} + nT_0 < t \le T_p + nT_0\right) \\ U_{pvm} & (T_p + nT_0 < t \le T_0 + nT_0) \end{cases}$$

where, $T_0$ is a period of the trapezoidal disturbance, T is a total duration at two waists of the trapezoidal disturbance in a period, $T_p$ is a duration of the disturbance in a period, n is a non-negative integer, $U_{pvm}$ is a voltage reference of PVA at the maximum power, and $\Delta U_{pv}$ is an amplitude of the trapezoidal disturbance; and if the PCC voltage $U_{pcc}$ exceeds the threshold set by the passive method, it is judged as islanding; otherwise, judge whether changing rule of the PCC voltage $U_{pcc}$ is consistent with changing rule of calculated voltage $U_{pccp}$ under the trapezoidal disturbance; If it is consistent, it is judged as islanding; otherwise, it is pseudo islanding, and continue to monitor changes in the PCC voltage $U_{pcc}$.

2. The islanding detection method in DC microgrids according to claim 1, wherein, judge whether the change rule of $U_{pcc}$ is consistent with that of the calculated PCC voltage $U_{pccp}$ under the trapezoidal disturbance is to judge whether the PCC voltage meets the following two conditions: 1) The measured value PCC voltage $U_{pcc}$ of the trapezoidal disturbance at the two waists is equal to a calculated value, $U_{pccp1}$, or the measured value PCC voltage $U_{pcc}$ at an upper base of the trapezoidal disturbance is equal to a calculated value $U_{pccp2}$; 2) A change period $T_{pcc}$ of the PCC voltage $U_{pcc}$ is equal to the trapezoidal disturbance period, $T_0$.

3. The islanding detection method in DC microgrids according to claim 2, wherein, the calculation steps of the PCC voltage of the trapezoidal disturbance at the two waists are as follows:

$$\Delta P_1 = \sum_{j=2}^{s}\left[\left(I_{pv(j-1)} - \frac{U_{pv(j-1)}}{R_s + r_{dj}}\right)\Delta U_{pvj} - \frac{1}{R_s + r_{dj}}(\Delta U_{pvj})^2\right]$$

$$r_{dj} = \frac{\Delta U_{pvj}}{\Delta I_{pvj}}$$

$$\Delta U_{pvj} = U_{pvj} - U_{pv(j-1)}$$

$$\Delta I_{pvj} = I_{pvj} - I_{pv(j-1)}$$

$$U_{pccp1} = U_{pccm}\sqrt{1 + \frac{\Delta P_1}{P_m}}$$

where, $\Delta P_1$ represents a change of PVA output power at two waists of the trapezoidal disturbance, and $U_{pccm}$ represents a PCC voltage when the PVA port voltage is equal to $U_{pvm}$. $U_{pvj}$ and $I_{pvj}$ are a sampling values of PVA port voltage and output current in current time, and $U_{pv(j-1)}$ and $I_{pv(j-1)}$ are a sampling values at a previous moment respectively, $\Delta U_{pvj}$ represents a change of PVA port voltage after each sampling, $\Delta U_{pv} = \Delta U_{pv2} + \Delta U_{pv3}' \ldots + \Delta U_{pvs}$, s is a number of sampling (s>2), $r_{dj}$ is a dynamic resistance calculated after each sampling;

the calculation steps of the PCC voltage $U_{pccp2}$ at the upper base of the trapezoidal disturbance are as follows:

$$\Delta P_2 = \frac{1}{R_{dp} + R_s}\left[I_{sc}R_{dp}(U_{pvp} + \Delta U_{pv}) - (U_{pvp} + \Delta U_{pv})^2\right] - P_m$$

$$R_{dp} = \frac{U_{pvp} + I_{pvp}R_s}{I_{sc} - I_{pvp}}$$

$$U_{pccp2} = U_{pccm}\sqrt{1 + \frac{\Delta P_2}{P_m}}$$

where, $\Delta P_2$ is a change of PVA output power at the upper base of the trapezoidal disturbance, $P_m$ is an output power when the PVA port voltage is $U_{pvm}$, $U_{pvp}$ is a PVA port voltage when the trapezoidal disturbance reaches its maximum value;

$U_{pvp}=U_{pvm}+\Delta U_{pv}$, Rap is equivalent static resistance of PVA when PVA port voltage is equal to $U_{pvp}$.

* * * * *